United States Patent
Klaedtke

(10) Patent No.: US 11,546,263 B1
(45) Date of Patent: Jan. 3, 2023

(54) DELAYED PROPAGATIONS FOR SLIDING-WINDOW AGGREGATIONS OVER OUT-OF-ORDER STREAMS

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/493,897

(22) Filed: Oct. 5, 2021

Related U.S. Application Data

(60) Provisional application No. 63/230,074, filed on Aug. 6, 2021.

(51) Int. Cl.
   *H04L 29/06* (2006.01)
   *H04L 47/22* (2022.01)
   *H04L 47/283* (2022.01)

(52) U.S. Cl.
   CPC .......... *H04L 47/225* (2013.01); *H04L 47/283* (2013.01)

(58) Field of Classification Search
   CPC . H04L 63/1408; H04L 47/225; H04L 47/283; H04L 63/1416; H04L 63/1441; H04L 63/20; G06F 16/24556; G06F 16/24568; G06F 7/14; G06F 7/32
   USPC ........................................................ 370/329
   See application file for complete search history.

(56) References Cited

U.S. PATENT DOCUMENTS

| | | | |
|---|---|---|---|
| 9,628,541 B2 | 4/2017 | Branson et al. | |
| 10,277,716 B2 * | 4/2019 | Bhaskar | H04L 65/65 |
| 10,311,061 B2 | 6/2019 | Ji et al. | |
| 10,725,887 B2 | 7/2020 | Klaedtke | |
| 11,055,262 B1 * | 7/2021 | Cseri | G06F 16/1824 |
| 2007/0226362 A1 * | 9/2007 | Johnson | H04L 47/34 709/230 |
| 2017/0132285 A1 * | 5/2017 | Ji | G06F 16/24568 |
| 2018/0039672 A1 * | 2/2018 | Sharanabasawa | G06F 16/24556 |
| 2018/0167435 A1 * | 6/2018 | Kinarti | G06F 5/00 |
| 2019/0147670 A1 * | 5/2019 | Chopra | G05B 23/0243 701/29.1 |
| 2019/0207962 A1 | 7/2019 | Wang et al. | |
| 2020/0162388 A1 * | 5/2020 | Lam | H04L 67/1023 |
| 2020/0183590 A1 | 6/2020 | Carrera Perez et al. | |
| 2020/0196031 A1 * | 6/2020 | Joppich-Dohlus | G01D 9/005 |
| 2020/0210430 A1 | 7/2020 | Shen et al. | |
| 2021/0044726 A1 * | 2/2021 | Lu | H04N 21/21805 |
| 2021/0075730 A1 * | 3/2021 | Palermo | H04L 47/125 |

(Continued)

OTHER PUBLICATIONS

Traub, Jonas et al. "Scotty: General and Efficient Open-source Window Aggregation for Stream Processing Systems," ACM Trans. Database Syst. 46, 1, Article 1, Mar. 2021, pp. 1-46, ACM, US.

(Continued)

*Primary Examiner* — Robert J Lopata

(74) *Attorney, Agent, or Firm* — Leydig, Voit & Mayer, Ltd.

(57) ABSTRACT

Systems, computer-readable media and methods for aggregating data items from an out-of-order data stream over a sliding window efficiently. The method delays the value aggregation for certain time windows and computes partial aggregations that can be reused for the multiple time windows. Aggregations may have any value type such as Boolean, integer, strings, floating point, vector and map.

15 Claims, 15 Drawing Sheets

(56) References Cited

U.S. PATENT DOCUMENTS

2021/0124746 A1\* 4/2021 Klaedtke .................. G06F 7/32
2022/0283876 A1\* 9/2022 Klaedtke ............... G06F 9/4498

OTHER PUBLICATIONS

K. Tangwongsan, M. Hirzel, S. Schneider, and K.-L. Wu: "General incremental sliding-window aggregation," Proceedings of the VLDB Endowment, 8(7), Sep. 2015, VLDB.org, US, pp. 702-713.
D. Basin, F. Klaedtke, and E. Zalinescu: "Runtime verification over out-of-order streams," ACM Transactions on Computational Logic, 21(1):5, Jan. 2020, ACM, US, pp. 1-42.
D. Basin, F. Klaedtke, and E. Zalinescu: "Greedily computing associative aggregations on sliding windows," Information Processing Letters, 115(2), Feb. 2015, pp. 186-192, Elsevier, Netherlands.
K. Tangwongsan, M. Hirzel, and S. Schneider: "Optimal and general out-of-order sliding-window aggregation," Proceedings of the VLDB Endowment, 12(10), Sep. 2020, pp. 1167-1180, VLDB. org, US.
J. Traub, P. M. Grulich, A. Rodriguez Cuellar, S. Breß, A. Katsifodimos, T. Rabl, and V. Markl: "Scotty: Efficient Window Aggregation for out-of-order Stream Processing," Feb. 24, 2018, IEEE ICDE 2018, France, pp. 1-4.
Bou, Savong et al. "CPiX: Real-Time Analytics Over Out-of-Order Data Streams By Incremental Sliding-Window Aggregation," IEEE, US, Jan. 2021, pp. 1-12.
Köhler, Sven et al. "Sliding Window Calculations on Streaming Data using the Kepler Scientific Workflow System," Procedia Computer Science 9, Elsevier, Netherlands, pp. 1639-1646, Dec. 2012.

\* cited by examiner

FIG. 12

```
// Assumption: The timestamp t must be smaller than the smallest timestamp of the values
// within the partial aggregation.
func (pa *PartialAggregation) Add(t Timestamp, v Value) {
    // Add new value to front.
    pa.front = append(pa.front, propagation(t, v))
    // Update front value.
    pa.val = pa.monoid.Op(v, pa.val)
}

// Assumption: qa must be after pa.  In particular, pa.back must be empty and pa.front must
// either be empty or the timestamp of pa.front's last element must be smaller than the
// timestamp of qa's first element.
// Assumption: pa and qa must be over the same monoid.
// Note: Append is destructive, i.e., qa must not be used afterwards.
func (pa *PartialAggregation) Append(qa *PartialAggregation) {
    // Update pa.back by stealing qa.back.
    pa.back = qa.back
    // Update pa.front by appending slices. Note that both slices are ordered descendingly.
    pa.front = append(qa.front, pa.front...)
    // Update pa.front value.
    pa.val = pa.monoid.Op(pa.val, qa.val)
    // Empty qa.
    qa.Zero()
} func (pa *PartialAggregation) Drop(t Timestamp) {
    if k := len(pa.front); k > 0 && !pa.front[0].ts.Before(t) {
        // Drop all values in back.
        pa.back = pa.back[:0]
        // Copy front to back.  Only copy the remaining delayed propagations. Also compute the
        // corresponding partial aggregations.
        for i, s := k - 1, pa.monoid.Neutral; i >= 0 && pa.front[i].ts.Before(t); i-- {
            s = pa.monoid.Op(s, pa.front[i].val)
            pa.back = append(pa.back,
                aggregated(propagation(pa.front[i].ts, pa.front[i].val), s))
        }
        // Empty front.
        pa.front = pa.front[:0]
        pa.val = pa.monoid.Neutral
    } else {
        // Drop values in back.
        i := sort.Search(len(pa.back), func(j int) bool { return !pa.back[j].ts.Before(t) })
        pa.back = pa.back[:i]
    }
}
```

FIG. 13

DELAYED PROPAGATIONS FOR SLIDING-WINDOW AGGREGATIONS OVER OUT-OF-ORDER STREAMS

CROSS-REFERENCES TO RELATED APPLICATIONS

The present application claims priority to U.S. Provisional Patent Application No. 63/230,074, filed Aug. 6, 2021, entitled "DELAYED PROPAGATIONS FOR SLIDING-WINDOW AGGREGATIONS OVER OUT-OF-ORDER STREAMS," which is hereby incorporated by reference in its entirety herein.

FIELD

The present disclosure relates to a method, system and computer-readable medium for delayed propagations for sliding-window aggregations over out-of-order data streams.

BACKGROUND

Data—often machine generated nowadays, e.g., by the devices and components of IT systems—is (or must often be) processed and analyzed in real time. For instance, in the Internet of Things (IoT), various devices continuously generate data, which is immediately analyzed by services running in the cloud or directly at edge nodes. The processed data is then possibly forwarded to data consumers, which may combine it with data from others sources or make decisions based on it.

Processing such data is often done by stream processing frameworks, engines, or services like Apache Flink (see https websites: <<flink.apache.org>>; <<de.wikipedia.org/wiki/Apache_Flink>>; <<azure.microsoft.com/en-us/services/stream-analytics/>>; and <<en.wikipedia.org/wiki/Azure Stream Analytics>> (the entire contents of each of which are hereby incorporated by reference in their entirety herein)), which process data online in the form of data or event streams. Their application areas are numerous and include system monitoring, system verification and debugging, intrusion, surveillance, fraud detection, data mining like in advertising and electronic trading, and many others.

Analyses in those application areas often involve some form of aggregating data in real time over a sliding window, cf. M. Stonebraker, U. Cetintemel, and S. Zdonik: "The 8 requirements of real-time stream processing," SIGMOD Record 34(4), 2005 (the entire contents of which is hereby incorporated by reference in its entirety). A simple example of a data aggregation over a sliding window is to continuously count the bids in an online auction over the last hour. Data aggregations over sliding windows are stateful computations. A state essentially consists of the currently active/incomplete time windows with their tentative aggregation values. A newly received stream element may create new time windows, trigger the update of multiple tentative aggregation values, and finalize the aggregation of several time windows. However, maintaining the state can be computationally expensive and the state updates can quickly become the bottleneck, in particular, in real-time applications with high data velocity.

The efficient processing of data streams is further complicated when stream elements may not be necessarily received in the order they are generated. The analysis results may depend on the order in which the data of the stream elements is processed. Network delays and retransmissions of network packets are one reason that stream elements may not be ordered in data streams. Buffering and reordering the stream elements delays the outcome of an analysis, i.e., harming the latency of the output of the processed data stream. Furthermore, buffering and reordering may result in a huge memory and computational overhead, which can quickly become another bottleneck.

D. Basin, F. Klaedtke, and E. Zalinescu: "Runtime verification over out-of-order streams," ACM Transactions on Computational Logic, 21(1):5, 2020 (the entire contents of which is hereby incorporated by reference herein) describes a graph-based data structure to monitor system behavior on out-of-order event streams. Optimizations of this graph-based data structure are described in F. Klaedtke: "Method for operating a monitoring entity," U.S. Ser. No. 10/725,887B2 (the entire contents of which is hereby incorporated by reference herein). However, in the described monitoring approach, the analysis results are restricted to Boolean values. Roughly speaking, one is limited to check whether a given specification is true or false at a time point. This limits also the aggregations to Boolean values.

SUMMARY

An aspect of the present disclosure provides a computer-implemented method of computing data aggregations in a sliding window over out-of-order data streams received from a distributed system of data producer components by delaying value propagations, the method being implemented in a processor connected to a memory storing a data structure including a hierarchical arrangement of nodes, wherein nodes on a same horizontal layer are associated to a same operator, initial value and metric constraint. The method includes receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window, creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists, iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation, determining for each next node whether to delay the propagation, and delaying propagation of the partial aggregation to a next aggregation node in response to determining that the propagation is to be delayed.

BRIEF DESCRIPTION OF THE DRAWINGS

Subject matter of the present disclosure will be described in even greater detail below based on the exemplary Figures. All features described and/or illustrated herein can be used alone or combined in different combinations. The features and advantages of various embodiments will become apparent by reading the following detailed description with reference to the attached drawings, which illustrate the following:

FIG. 12 depicts Listing 1: partial aggregations, according to an embodiment;

FIG. 13 depicts Listing 2: partial aggregations (continued), according to an embodiment.

DETAILED DESCRIPTION

Figure 1:
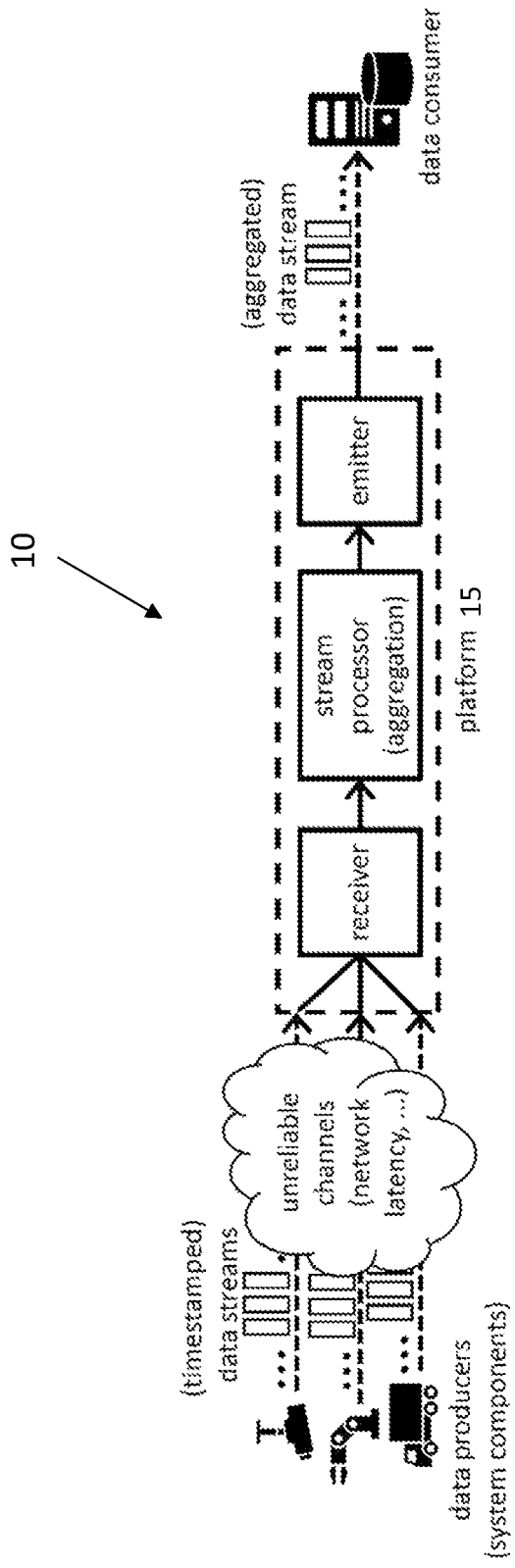
FIG. 1 illustrates a system model, according to an embodiment.

The present disclosure provides a method for aggregating data items from an out-of-order data stream over a sliding window efficiently. The method delays the value aggregation for certain time windows and computes partial aggregations that can be reused for the multiple time windows.

An advantage of embodiments of the present disclosure includes that arbitrary data types can be provided in aggregations like maps (with no restrictions to Booleans as was in the state of the art), also there may be no restriction to other basic types, like integers.

Embodiments of the present disclosure also provide for aggregations to be computed faster (over that which was capable prior to the invention). In the state of the art, every relevant time window may be updated for a newly received stream element. Because embodiments of the present disclosure delay the propagation, fewer time windows are updated when receiving a new stream element. Furthermore, embodiments of the present disclosure reduces recomputations of partial aggregated values, which also leads to performance improvements.

Embodiments of the present disclosure extend the graph-based data structure to non-Boolean values and allows one to compute aggregations with non-Boolean values over a sliding window on out-of-order data streams. Furthermore, aspects of the present disclosure include delays in the propagation of a data value for an aggregation, if the respective aggregation is not yet complete since an earlier or later data value is also missing. Delayed propagations are collected and partially aggregated to propagate them efficiently later. Delaying and collecting propagations for multiple time windows speeds-up the computation of aggregating data values.

According to an embodiment, a computer-implemented method of computing data aggregations in a sliding window over out-of-order data streams received from a distributed system of data producer components by delaying value propagations, the method being implemented in a processor connected to a memory storing a data structure including a hierarchical arrangement of nodes, wherein nodes on a same horizontal layer are associated to a same operator, initial value and metric constraint. The method includes receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window, creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists, iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation, determining for each next node whether to delay the propagation, and delaying propagation of the partial aggregation to a next aggregation node in response to determining that the propagation is to be delayed.

According to an embodiment, the method further includes, when a status of an aggregation node in the plurality of aggregation nodes is final, sending a final value of the aggregation node to a node on a layer above the first horizontal layer.

According to an embodiment, the final value of the first node has a value type selected from the group consisting of Boolean, integer, strings, floating point, vector and map.

According to an embodiment, the determining for a next node whether to delay the propagation includes determining whether the next node is waiting for a value from a predecessor node on the same horizontal layer as the first node.

According to an embodiment, the method further includes resuming propagation of a delayed partial aggregation at a later time in response to receiving, by the node where the delay occurred, a value from another node on the lower layer.

According to an embodiment, a partial aggregation is stored as a balanced search tree or an ordered array.

According to an embodiment, the method further includes dropping a delayed propagation of the partial aggregation at an aggregation node when it is determined that the aggregation node is no longer within the time window of the first aggregation node.

According to an embodiment, a network device in a distributed system is provided, which includes one or more processors, and a memory storing instructions and a data structure including a hierarchical arrangement of nodes, wherein nodes on a same horizontal layer are associated to a same operator, initial value and metric constraint, wherein the instructions when executed by the one or more processors cause the network device to implement a method of computing aggregations in a sliding window over out-of-order data streams received from data producer components of the distributed system of by delaying value propagations. The method includes receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window, creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists, iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation, determining for each next node whether to delay the propagation, and delaying propagation of the partial aggregation to a next aggregation node in response to determining that the propagation is to be delayed.

According to an embodiment, the memory further stores instructions, which when executed by the one or more processors cause the network device to, when a status of an aggregation node in the plurality of aggregation nodes is final, sending a final value of the aggregation node to a node on a layer above the first horizontal layer.

According to an embodiment, the instructions for determining for a next node whether to delay the propagation includes instructions for determining whether the next node is waiting for a value from a predecessor node on the same horizontal layer as the first node.

According to an embodiment, the final value of the first node has a value type selected from the group consisting of Boolean, integer, strings, floating point, vector and map.

According to an embodiment, the memory further stores instructions, which when executed by the one or more processors cause the network device to resume propagation of a delayed partial aggregation at a later time in response to receiving, by the node where the delay occurred, a value from another node on the lower layer.

According to an embodiment, a partial aggregation is stored in the memory as a balanced search tree or an ordered array.

According to an embodiment, the memory further stores instructions, which when executed by the one or more processors cause the network device to drop a delayed propagation of the partial aggregation at an aggregation node when it is determined that the aggregation node is no longer within the time window of the first aggregation node According to an embodiment, a tangible, non-transitory computer-readable medium is provided that has instructions thereon which, upon being executed by one or more processors, alone or in combination, provide for execution of method of computing aggregations in a sliding window over out-of-order data streams received from a distributed system of data producer components by delaying value propagations, wherein the method includes defining a data structure in a memory unit coupled to the one or more processors, the data structure including a hierarchical arrangement of nodes, wherein nodes on a same horizontal layer are associated to a same operator, initial value and metric constraint, receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window, creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists, iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation, determining for each next node whether to delay the propagation, and delaying propagation of the partial aggregation to a next aggregation node in response to determining that the propagation is to be delayed.

System Model

Aspects of the present disclosure are explained in connection with an underlying system model 10 illustrated by FIG. 1. System 10 may be composed of multiple components. These components could be, for example, software components of a cloud-based IT system or IoT devices or a mixture of both. Some of the system components produce data. Such a component is called a data producer. For instance, an IoT sensor may measure the temperature every second. The device's measurements are continuously sent to a platform 15, e.g., a network device in a distributed system or network of components. The platform in turn hosts a service for processing and analyzing the data from the data producers. That is, the service receives and processes a data stream from the data procedures. Processing the data usually includes the aggregation of data values of some sort. For instance, aggregation may include computing the average temperature over a period of time together with the minimum and maximum temperatures in this period. The processed data, possibly aggregated, is again a data stream that is emitted continuously to a data consumer, which may just collect the data, process it further, or may make decisions and/or implement actions based on the processed data. For instance, if the average temperature is too high, the data consumer might start a cooling unit, reduce the workload of a component, or shut down a component.

Figure 2:
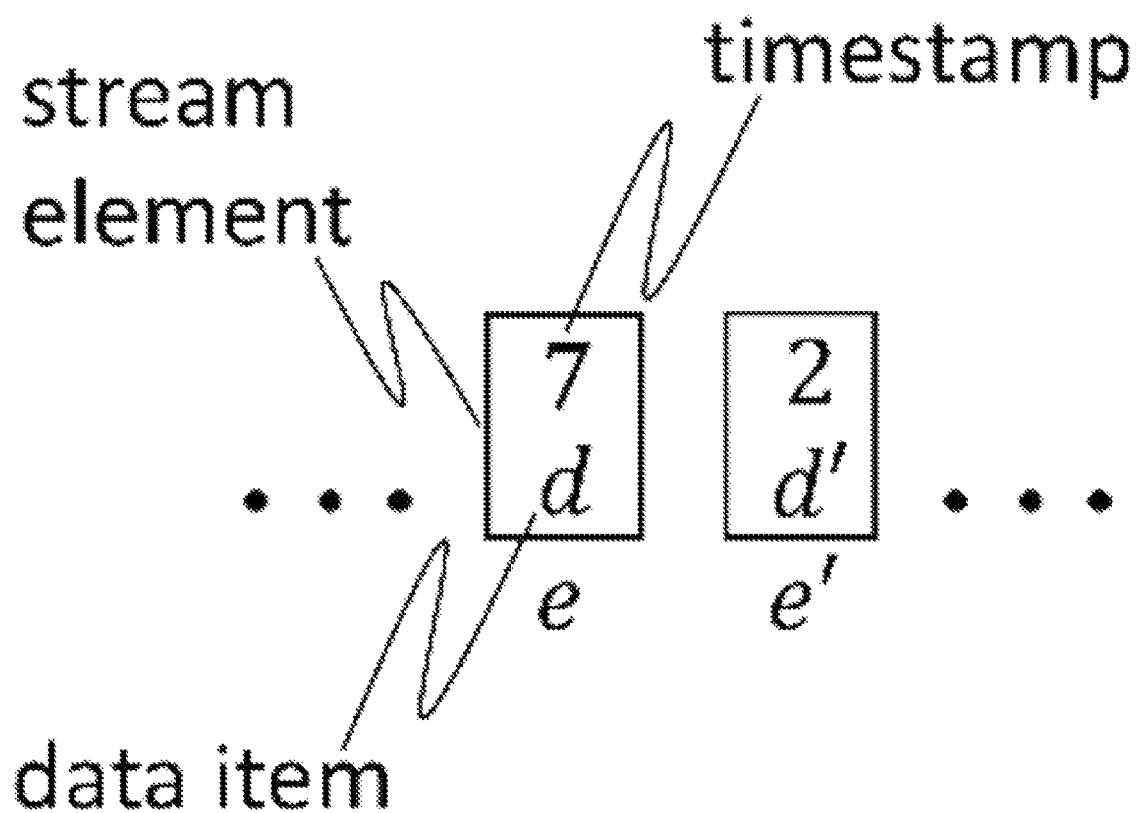
FIG. 2 illustrates an out-of-order data stream (the stream element e appears before e' in the stream although its timestamp is greater than the timestamp of e'), according to an embodiment.

The stream elements of the data streams may not necessarily be received in the order in which they are produced. That is, stream elements may be received out of order at the platform. One reason for out-of-order stream elements includes network delays. Furthermore, dropped network packets may result in an infinite delay, if not a resend. For inferring the order of the stream elements, it is assumed that each stream element comprises a timestamp. The timestamp is the creation time of the stream element. Timestamps are linearly ordered. Often the timestamps originate from physical clocks. FIG. 2 illustrates an example where each stream element includes a timestamp and a data item. In this example, the stream element e' appears out of order within the data stream as its timestamp (2) is less than the timestamp (7) of the previous stream element e.

Aggregations Over Sliding Windows

Figure 3:
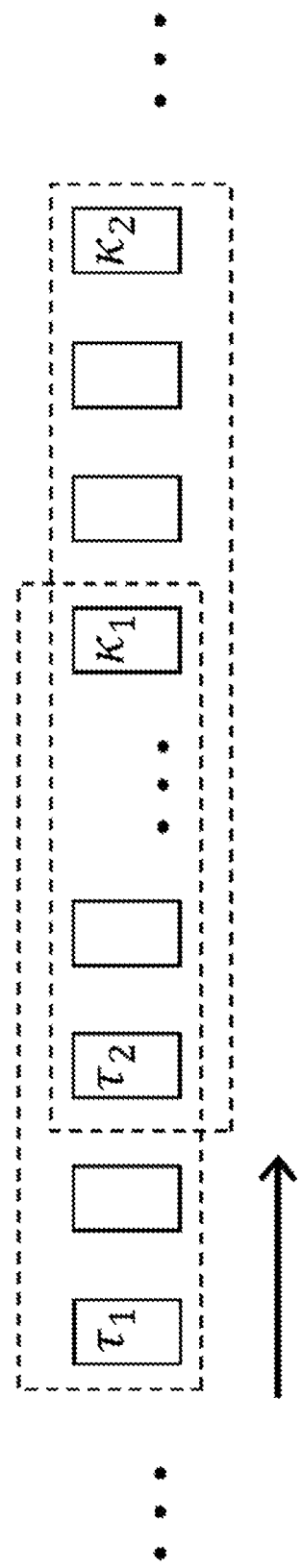
FIG. 3 illustrates a sliding window in a data stream in which the stream elements are ordered (and without missing data elements), according to an embodiment.

Data aggregation combines the data items of multiple stream elements. Typically, the combination involves the data items of stream elements received over some period of time. Such periods of time are often given by sliding windows. Sliding windows are time windows that move together with the data stream, provided its stream elements are correctly ordered. FIG. 3 illustrates an example where the τ timestamps are the timestamps of the first stream element of a time window and the K timestamps are the timestamps of the last stream element of a time window. The time windows can, e.g., be specified by a duration together with a direction (forward or backward) or by dedicated start and end tags. Note that time windows can overlap as shown in FIG. 3, i.e., data elements that occur in multiple time windows contribute to the multiple aggregations. Furthermore, the number of stream elements within the time windows may differ. It is even possible that a time window is empty, i.e., it does not contain any stream elements.

As a simple example of a data aggregation, consider to count the failed login attempts within the last hour of a device in an IT system, where the data stream consists of timestamped, logged system events. The counting can be triggered through dedicated check events or takes place periodically, e.g., every ten minutes. When the stream elements are not necessarily received in the order in which they are generated, it becomes even for this simple example, challenging to correctly and efficiently count the failed login attempts within a given time window. In particular, stream elements that arrive late should not be excluded when computing the aggregation over a sliding window.

Aggregations are usually defined over an underlying monoid. That is, the data items are from a set D with an associative operator $\otimes: D \times D \rightarrow D$, which combines the data items, and a neutral element $e \in D$. Note that since $\otimes$ is associative, it is irrelevant how to put the parentheses in a term like $d_1 \otimes d_2 \otimes \ldots \otimes d_n$. However, the element order matters when $\otimes$ is not commutative. Instances of monoids are the integers with addition + and 0 as neutral element, and the n×n matrixes, for n≥1, with matrix multiplication and the identity matrix. See K. Tangwongsan, M. Hirzel, S. Schneider, and K.-L. Wu: "General incremental sliding-window aggregation," Proceedings of the VLDB Endowment, 8(7), 2015 (the entire disclosure of which is hereby incorporated by reference herein) for more instances.

A graph-based data structure is described in D. Basin, F. Klaedtke, and E. Zalinescu: "Runtime verification over out-of-order streams," ACM Transactions on Computational Logic, 21(1):5, 2020 (the entire disclosure of which is hereby incorporated by reference herein) and some of its optimizations are described in F. Klaedtke: "Method for operating a monitoring entity," U.S. Ser. No. 10/725,887B2 (the entire disclosure of which is hereby incorporated by reference herein).

Figure 4A:
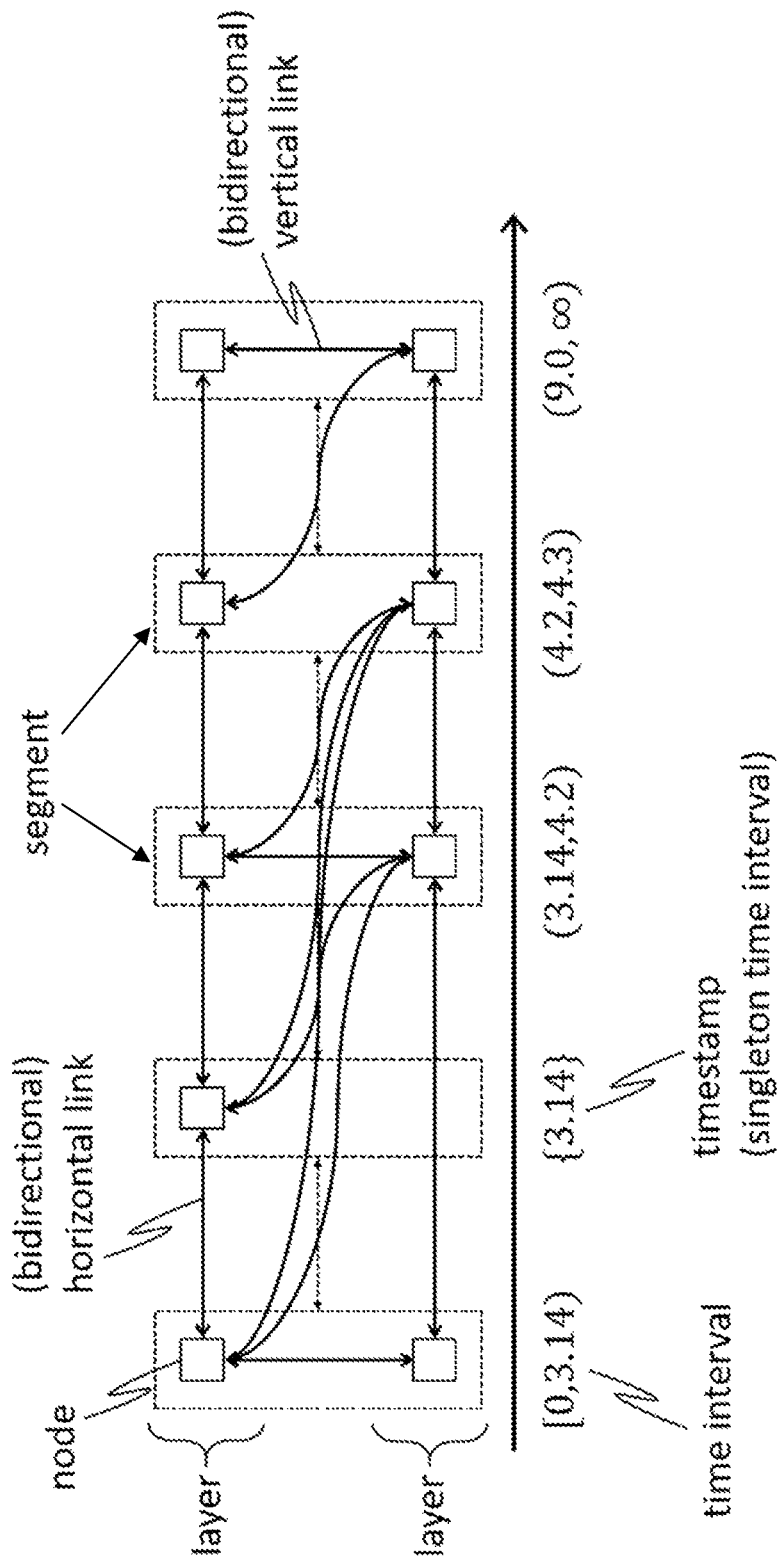
FIG. 4A illustrates a graph-based data structure.
Figure 4B:
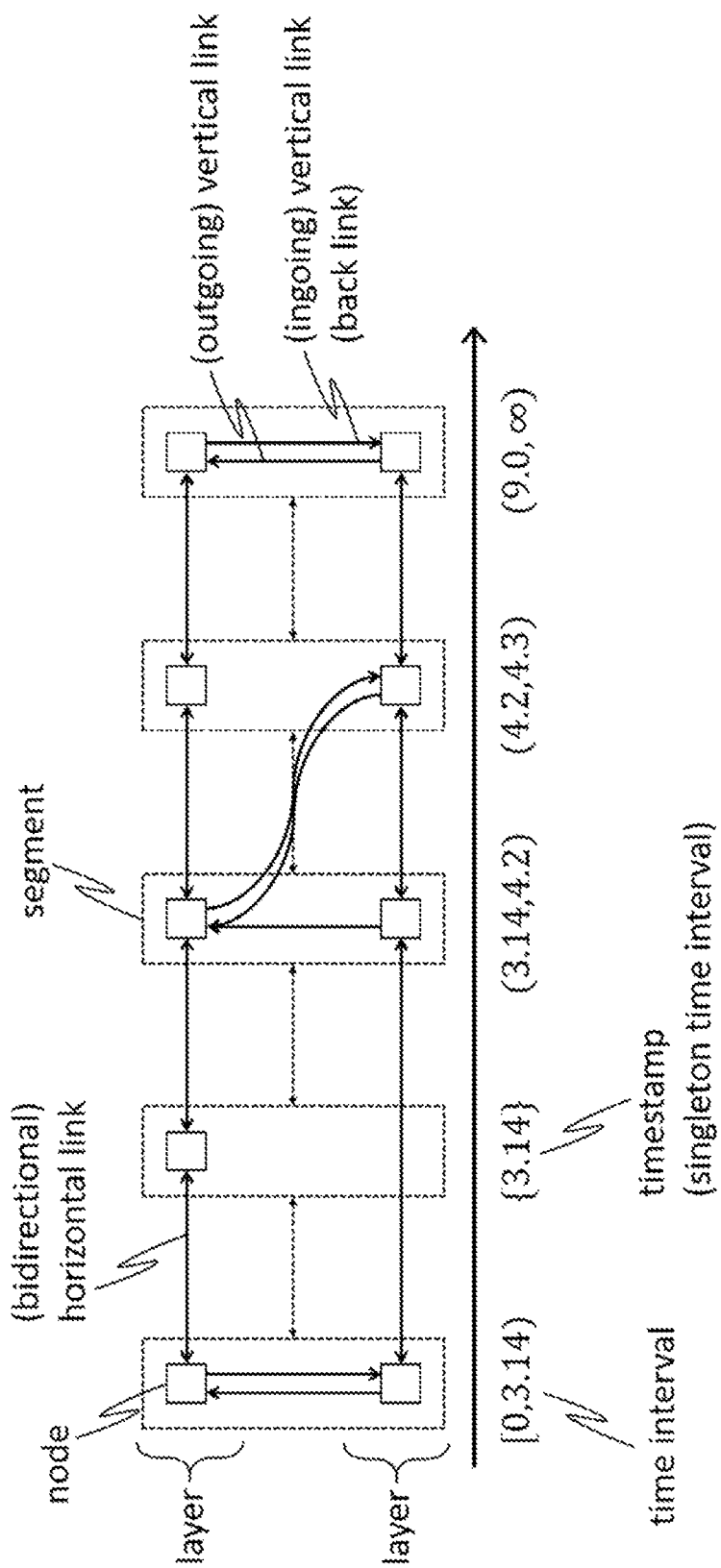
FIG. 4B illustrates an optimized graph-based data structure.

FIGS. 4A and 4B illustrate examples of a graph-based data structure and an optimized graph-based data structure, respectively. The nodes of the graph-based data structure are grouped into segments. Each segment corresponds either to a time point or a gap. Time points are associated to the timestamps of received stream elements and gaps are associated to nonoverlapping, nonempty, nonsingelton time intervals, which act as placeholders for time points that may be added in the future to the graph-based data structure. The segments are ordered ascendingly according to their timestamps and time intervals, and stored in a doubly-linked list. The nodes are horizontally stored in layers. Each layer corresponds to a node type, e.g., the nodes of a certain temporal subformula from the provided specification. The nodes of each layer are also stored in a doubly-linked list. That is, each node has horizontal links to its predecessor and successor of the same kind. Since the segments and the nodes are ordered by their timestamps and time intervals, the nodes can be compared by their temporal locations. In particular, the "closest" node to another node with a certain condition is well defined.

Furthermore, each node may also have vertical links. In D. Basin, F. Klaedtke, and E. Zalinescu: "Runtime verification over out-of-order streams," ACM Transactions on Computational Logic, 21(1):5, 2020, each node has links to the nodes to which it propagates its (Boolean) value, when it is final. Furthermore, to each such link there is a corresponding back link. To simplify matters, assume in the following that nodes of a layer L can at most only receive values from some of the nodes from a single lower layer L' and nodes of a layer L (if not the top layer) propagate their values to some nodes of a single upper layer L". Note that the nodes of some layers obtain their values directly from the data items of the received stream elements.

In an embodiment, explicit links are stored in memory. In contrast, implicit links are not stored in memory; they are derived from the explicit links (together with the node's timestamp/gap and the metric constraints). For example, the graph-based data-structure described in F. Klaedtke: "Method for operating a monitoring entity," U.S. Ser. No. 10/725,887B2 only stores some of the vertical links explicitly. The remaining vertical links are implicit and derived from both the explicit vertical links and the horizontal links whenever needed. This has the advantage that when updating the graph-based data structure (e.g., by deleting a node when propagating values up or splitting a segment when receiving a new stream element) less links must be updated. Furthermore, less memory is used to store the graph-based data structure. In particular, it suffices to store the following vertical links explicitly. A node has an explicit outgoing vertical link to the closest node to which a value is propagated to. For all outgoing links from nodes $N_1, \ldots, N_n$ to a node N, N has a single back link. It suffices to store the vertical link from N to the node $N_n$ which is the farest node with an explicit outgoing vertical link to the node N, assuming that $N_1, \ldots, N_n$ are ordered by their intervals. Note that there is no back link, if there are no nodes with an explicit outgoing link to N. If a node receives values from nodes at multiple different lower layers, it has back links for each layer.

For the graph-based data structure as illustrated in FIG. 4B, every node has constantly many outgoing links whereas for the graph-based data structure as illustrated in FIG. 4A, a node has linearly many outgoing links in the worst case. By constantly many outgoing links is meant that the number of outgoing links is constant. In an embodiment, for example, (1) a node has two horizontal outgoing links (predecessor and successor), provided that the node is not the first or last node in the list, and (2) a single outgoing vertical link, provided that the node is not a node of the top layer. Note that for the special cases, a node has even fewer links. For instance, if the node is the first node in the list, the link to its predecessor is nil. Note that these links are the explicit*links that are mentioned/explained above. Note that storing a single link in memory is considerably cheaper than storing a list of links in memory. Also note that this graph-based data structure contains even slightly fewer links as the one described in F. Klaedtke: "Method for operating a monitoring entity," U.S. Ser. No. 10/725,887B2. Finally, the values stored at the nodes are not limited to Boolean values as in D. Basin, F. Klaedtke, and E. Zalinescu: "Runtime verification over out-of-order streams," ACM Transactions on Computational Logic, 21(1):5, 2020. In fact, the nodes' values can be of any data type such as integers, floats, vectors, and maps.

The basic updates of the graph-based data structures may include (1) adding a time point, (2) removing a gap, and (3) propagating values. For adding a time point, a gap that contains the time point's timestamp is split and the gap's segment is replaced by the resulting segments with their nodes. The nodes in the new segments inherit their values from the nodes of the segment that is split. Furthermore, note that when propagating values, removing a gap, or splitting a segment, irrelevant nodes are removed from the graph-based data structure. Shrinking a gap is an example of another update of the graph-based data structure.

Figure 5:
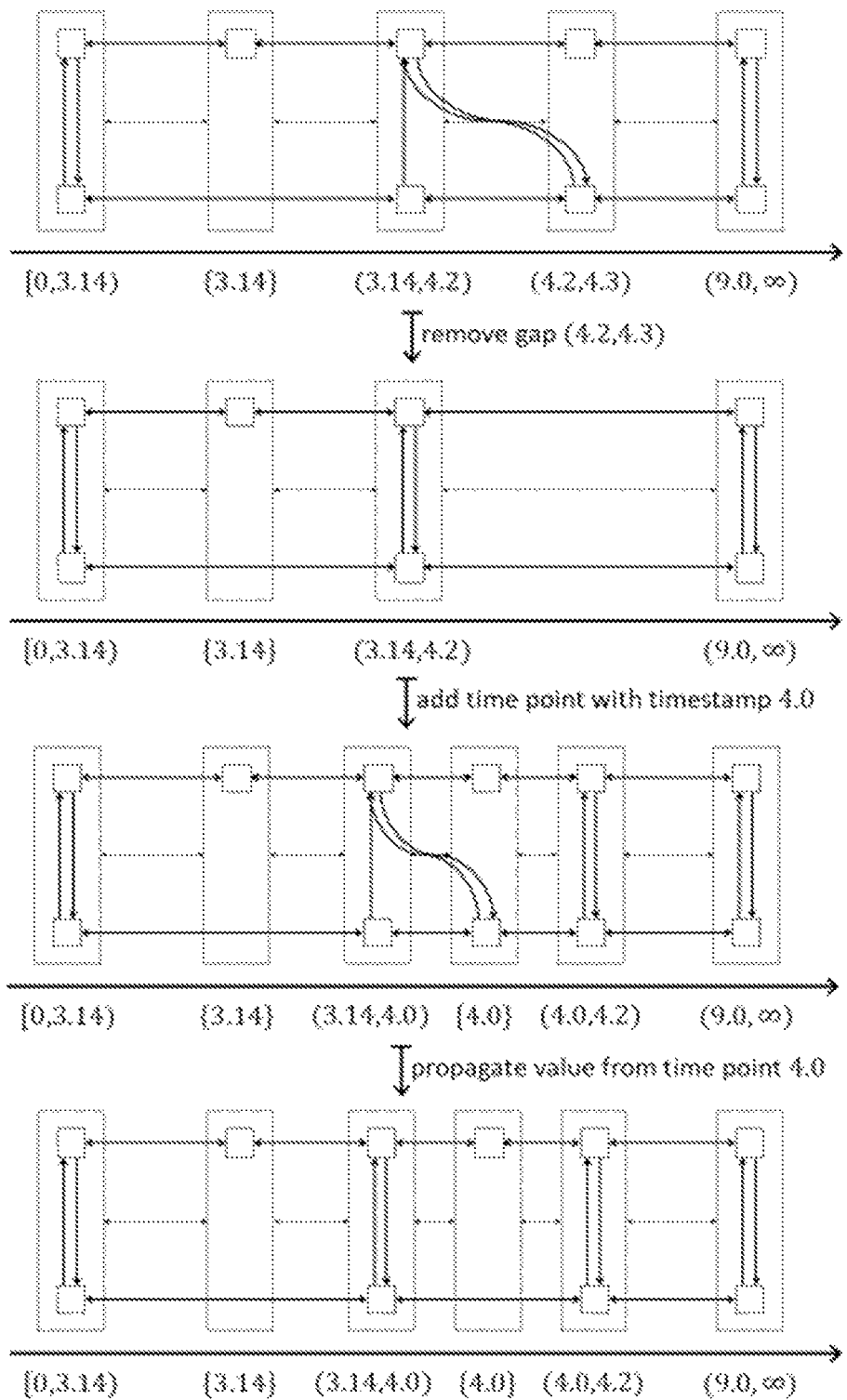
FIG. 5 illustrates examples of updates to the graph from FIG. 4B, which is shown at the top of FIG. 5, according to various embodiments.

FIG. 5 illustrates examples of updates to the graph from FIG. 4B, which is shown at the top of FIG. 5. First, the gap (4.2,4.3) is removed from the graph. Second, a new time point with the timestamp 4.0 is added to the graph. For adding this new time point, the interval (3.14,4.2), which includes the timestamp 4.0, is split and results in new segments. Third, the node of the lower layer in the segment {4.0} propagates its value upwards, and the node is removed and the values of the nodes to which the value is propagated are updated. It should be appreciated that this example does not illustrate all cases. For example, multiple gaps could be removed, multiple values could be propagated, splitting a gap may not always result in three new segments, nodes with no outgoing link may be removed from the graph, nodes that do not have an ingoing node (explicit or implicit) are complete and propagate their value, etc.

Aggregation Nodes

A new type of node, namely an aggregation node, is introduced herein. Each such node may be associated to an aggregation over a time window given by an associative operator $\otimes: D \times D \rightarrow D$, an initial value $z \in D$, and a metric constraint given by an interval I. The interval I together with the interval of a node's segment determines the node's time window of the aggregation. For example, if the segment corresponds to a time point with the timestamp $\tau$, then the time window may be $\tau+I$, and if the segment corresponds to a gap with the time interval J, then the time window may be J+I. Intuitively speaking, $\tau$ and J are shifted by I and covers all the segments that overlap with the time window. A segment with the time interval K can be (i) included in J+I (i.e., $K \subseteq J+I$), (ii) partially included in J+I (i.e., $K \cap (J+I) \neq \emptyset$ but not $K \subseteq J+I$), and (iii) disjoint to J+I (i.e., $K \cap (J+I) = \emptyset$). In case (i), the input node of the segment with time interval K is included in the time window and in case (iii), the input node of the segment with time interval K is not included in the time window. In case (ii), at least one of the segments must be a gap and its "pending" whether the input node of the segment with time interval K is included in the time window or not.

In an embodiment, aggregation nodes on the same horizontal layer are associated to the same initial properties, e.g., operator, initial value, and metric constraint. Note that above, the time windows were restricted such that they span only over stream elements with equal or larger timestamps. An extension for time windows that also or only includes stream elements with smaller timestamps is straightforward. In particular, aggregations with time windows in both directions can be split into two aggregations with unidirectional time windows.

Figure 6:
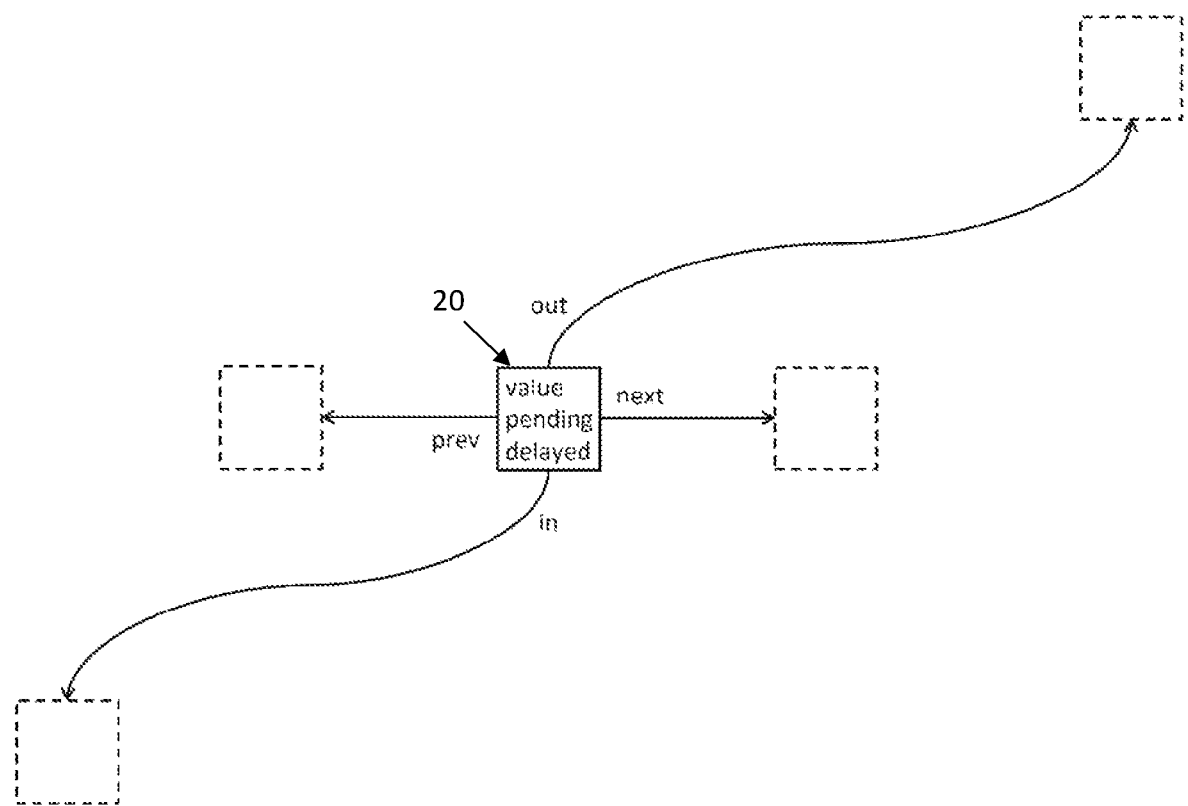
FIG. 6 illustrates an aggregation node, according to an embodiment.

FIG. 6 shows an example of an aggregation node 20 and fields of the node, according to an embodiment. In an embodiment, an aggregation node 20 may include the fields prev, next, out, and in. The fields prev, next, out, and in of an aggregation node 20 represent the explicit horizontal and vertical links of the graph-based data structure. The field value of an aggregation node 20 may store the values that have been propagated to the node so far. The propagated values may be combined, e.g., combined by an association operator $\otimes$, to a single value; initially, the value is z. Note that the value is not necessarily a Boolean value; the value type depends on the aggregation. For example, the value may be an integer value a map, a floating point value, etc. Furthermore, the value can be tentative. For example, the value may be tentative if not all values within the node's time window have been propagated to the aggregation node yet. Additionally, an aggregation node 20 in an embodiment includes the fields pending and delayed for pending and delayed propagations:

Pending propagations are propagations from a time point that satisfy the metric constraint of the aggregation but the metric constraint is not valid, i.e., the time point may or may not be part of the aggregation's time window. Each pending propagation comprises a timestamp and a value. An aggregation node can only have pending propagations if the node's segment corresponds to a gap.

Delayed propagations are propagations that have not yet been fully carried out. In particular, the propagations have been paused at this node. Analogously to pending propagations, each delayed propagation comprises a timestamp and a value.

Both, pending and delayed propagations are ordered by their timestamps. For example, they can be stored in arrays or balanced search trees.

In the Go programming language, for example, an aggregation node can be implemented as a structure (struct) type with the following fields:

type AggregationNode struct {
  owner*Segment//The segment that contains the node.
  val Value//The node's value and its status.
  pending PendingPropagations//The node's pending propagations.
  delayed DelayedPropagations//The node's delayed propagations.
  next*AggregationNode//Horizontal link to the successor node.
  prev*AggregationNode//Horizontal link to the predecessor node.
  out*OutNode//Explicit outgoing vertical link.
  in*InNode//Explicit ingoing vertical link (back link).
} where a node's explicit links are implemented as pointers, in an embodiment. Note that a pointer for a link may be nil if no explicit link exists, e.g., if the node is the head of the doubly-linked list of aggregation nodes then its prev field is nil. Furthermore, note that the types of the (vertical) ingoing and outgoing nodes depend on the kinds of the nodes of the respective layer. Alternatively, an interface type for nodes with an API on the operations on nodes could be used. Additionally, an aggregation node type keeps a pointer to the segment in which the node is located (the owner field). For instance, by following this pointer, the node's timestamp or interval, respectively, can be obtained depending on whether the node is in a segment that is a time point or a gap.

Value Propagation

Figure 7:
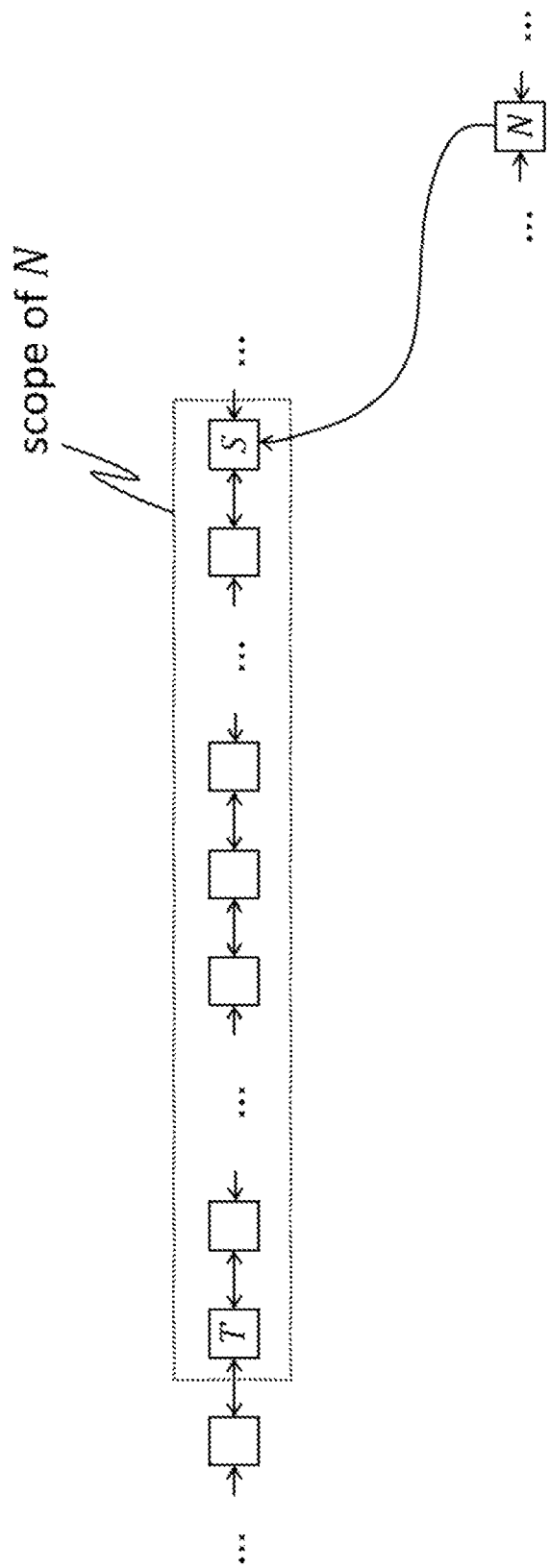
FIG. 7 illustrates value propagation (without delays), according to an embodiment.
Figure 8:
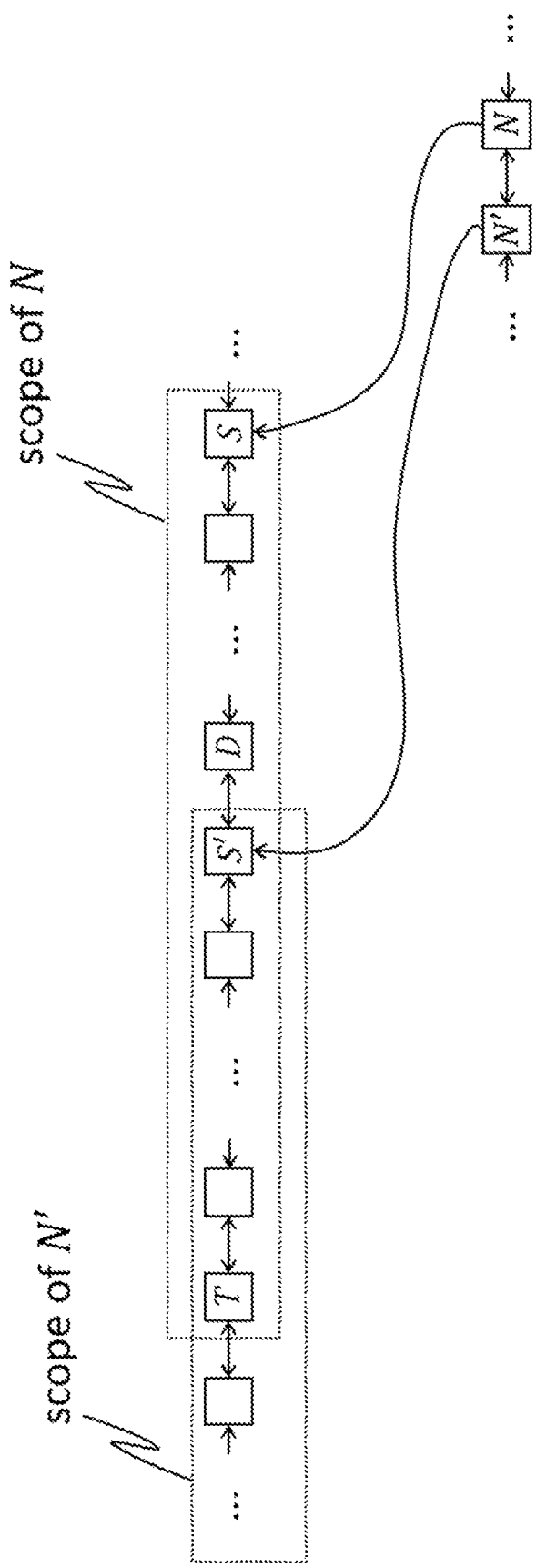
FIG. 8 illustrates value propagation (with delays), according to an embodiment.

FIGS. 7 and 8 illustrate the propagation of the value from a node N to the aggregation nodes of an upper layer, according to an embodiment. For propagating N's value, N preferably should be in a segment that is a time point with a timestamp. Otherwise, the segment in which N is contained is a gap segment. Propagating N's value would not be sound as the gap, which acts as a placeholder, may be removed later or split in multiple segments. Furthermore, N's value preferably should not be tentative when propagating N's value.

A propagation process without delaying propagations is illustrated in FIG. 7, which is described first as it helps to understand the propagation when propagations may be delayed and described afterwards. The dotted box in FIG. 7 contains all the aggregation nodes that are in the scope of N, i.e., that have the node N in their time window. In other words, N has outgoing vertical links exactly to the nodes in the dotted box, where the link to the closest node S is explicit; the other links are implicit and not shown in FIG. 7. In general, the scope of a node determines the farthest node to which the node propagate its value. For example, the scope can be given through a minimal or maximal timestamp. For the node N in FIG. 7, this value is min({tau}−I) or min(J−I), where I is the metric constraint of the aggregation and tau/J is the timestamp/gap of the node N. Furthermore, note that min(X) denotes the minimum of the set X. Recall that an aggregation node aggregates the values from nodes on a lower layer within a given time window. The time window of an aggregation node is given by the node's timestamp tau or the node's gap J and the metric constraint of the aggregation, i.e., an interval I. The scope of a node is defined from the perspective of a node from the lower layer, i.e., it specifies to which nodes the value is propagated to. In contrast, a time window of a node is defined from the perspective of a node on the upper layer, i.e., it specifies the nodes from which values are *received*.

N's value is propagated up along its outgoing explicit vertical link to the node S and then along the horizontal links on the upper layer until visiting a node that is too far from N, i.e., N is no longer in the aggregation node's time window, or the horizontal predecessor link is nil, i.e., at the head of the layer. In FIG. 7, this node is the predecessor of the node T (or nil). For all nodes between S and T, their tentative aggregation value is updated according to the propagated value. The nodes S or T could be in segments that are gaps and the segment of N might not be completely contained in their time window. In an embodiment, if this is the case, the timestamp of N's segment and N's value is added to their pending propagations, which are later carried out for descendant nodes, which originate from splitting segments. A pending propagation may also get dropped when its timestamp is not partly contained anymore in the time window of the aggregation node.

Furthermore, N is removed from the graph-based data structure. The aggregation nodes between S and T that do not have explicit or implicit vertical links anymore and no pending propagations (i.e., N was their last remaining input) are complete, i.e., they finalize their value and propagate their value further up.

In a delayed propagation process, an embodiment of which is illustrated in FIG. 8, a propagation may be delayed when iteratively visiting the aggregations nodes, starting at S and continuing towards T. The propagation can be delayed at any of the nodes between S and T. For instance, propagations could be delayed at nodes in dedicated segments. In the following, the following strategy is fixed or set for delaying propagations as illustrated in FIG. 8, where the propagation is delayed at the node S'. S' is determined by going to N's predecessor node N' and then following its explicit outgoing vertical link. That is, S' is the first visited node that is waiting for a value from another node that is before N. If N has no predecessor, the propagation is not delayed. The propagation is also not delayed if the node S' is not between S and T. Furthermore, S and S' could be the same aggregation node. In this case, the propagation from N gets directly delayed at S.

The values of the nodes from S to D are updated according to the propagated value. S can—as above—be a node in a segment and the segment of N might not be completely contained in the time window of S. In the case, the propagation is added to S's pending propagations instead of updating S's value. Analogously, if D is T and the segment of N is not completely contained in the time window of T, the propagation is added to D's pending propagations.

Some of S's delayed propagations may also be propagated further. Namely, the delayed propagations δ at S that satisfy the following conditions are propagated together with N's value: δ has a timestamp between (i) N's timestamp and (ii) the timestamp or interval of the input to the aggregation node S next to N (if it exists). Note that this timestamp or interval in (ii) exists if N.next is not nil and N.next.out points to S. Otherwise, δ has a timestamp after N's timestamp and can also be propagated further.

When iterating through the nodes (from S and D), the above delayed propagations from S that are no longer in the time window of the currently visited aggregation node are dropped. The value and the pending propagations of the currently visited aggregation node are updated accordingly. At node S', the remaining propagations are added to the node's delayed propagations. Furthermore, according to the fixed strategy of delaying propagations, the aggregation nodes between S (excluding) and D do not have delayed propagations, since they have no explicit ingoing vertical link.

Under the assumption that all time windows contain O(n) nodes, a propagation without delaying propagations always visits linearly many nodes and performs linearly many value updates. When delaying propagations, only O(n) nodes are visited and updated in the worst case for the propagated value. However, if delayed propagations are carried out later separately, not much is gained as we may later visit and update the nodes (or their descendants that originate from splitting gaps). It is described next how to combine delayed propagations at an aggregation node efficiently, thus, allowing us to carry them out together, according to an embodiment.

Figure 9:
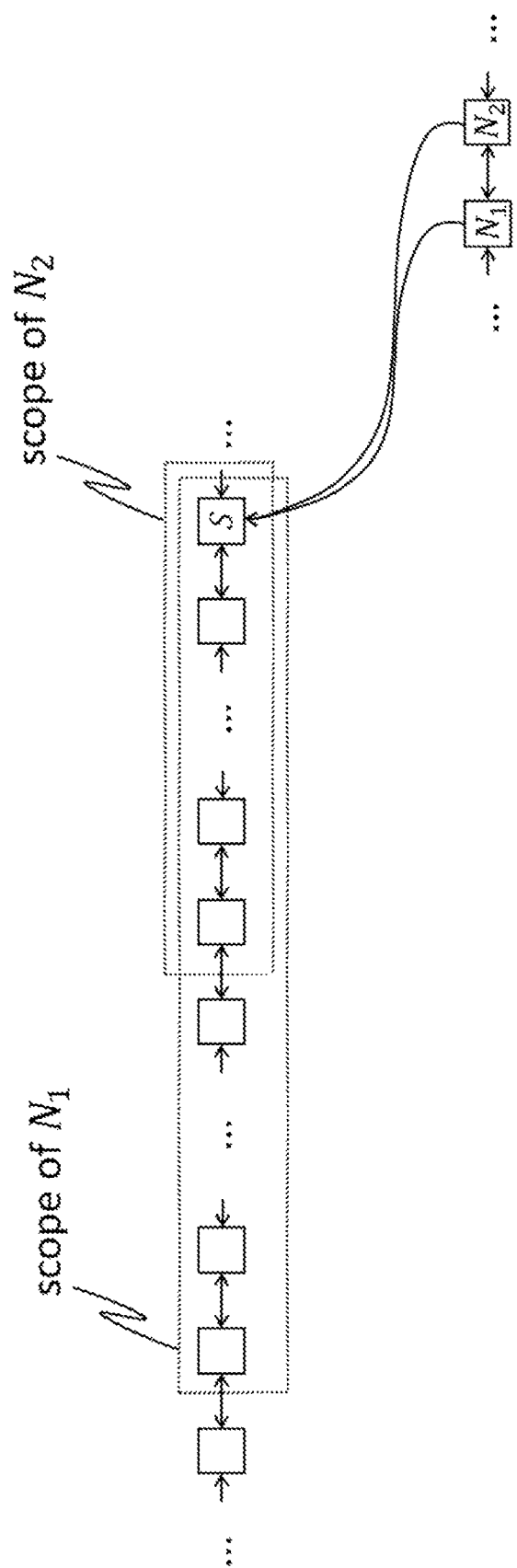
FIG. 9 illustrates prioritization of propagations, according to an embodiment.

When combining delayed propagations, it is beneficial to prioritize propagations. An instance is shown in FIG. 9, where the nodes $N_1$ and $N_2$ both propagate their value up along the explicit outgoing link to the same aggregation node S. One can use priority queues so that $N_2$ propagates its value before $N_1$. Priority should be given to nodes with larger timestamps if time windows span over stream elements to the right. This has the result that $N_2$'s propagation is immediately delayed, combined, and carried out together with $N_1$'s propagation. That is, when combining both propagations, they are essentially executed at once, instead of executing them sequentially.

Partial Aggregations

According to an embodiment, instead of separately updating the value of an aggregation node for each value that is propagated to the node, including delayed propagations, propagations can be combined into partial aggregations and the partial aggregations may be used when propagating values. Partial aggregations are stored at aggregation nodes as delayed propagations, using, e.g., as a balanced search tree or an ordered array. In an embodiment, the following operations may be performed on partial aggregations:
  P.Add(t, v): Add the propagation with timestamp t and value v to the partial aggregation P.
  P.Drop(t): Drop the propagations with the timestamp t or after t from the partial aggregation P.
  P.Append(Q): Append the partial aggregation Q to the partial aggregation P.

Furthermore, the following two functions may be used for partial aggregations:
  P.Key( ): Return the key of the partial aggregation P.
  P.Value( ): Return the value of the partial aggregation P.

An important aspect of a partial aggregation (in an embodiment) is the timestamp of the first propagation in the partial aggregation. When propagating a value from a node along its explicit outgoing link to an aggregation node, as shown in FIG. 8 from node N to node S, a determination is made whether the delayed propagations at S is "blocked" by N. These delayed propagations are stored and combined in a partial aggregation. The new propagation is added to this partial aggregation by using the Add operation (if no such partial aggregation exists, a new one is created that contains the propagation). Afterwards, the partial aggregation is propagated to the remaining aggregation nodes until it gets "blocked" or all remaining aggregation nodes have been visited. Note that when iterating through the aggregation nodes, the Drop operation may be used to drop irrelevant propagations from the partial aggregation. The Value function may be used when updating the values of the aggregation nodes. When a partial aggregation gets "blocked", the partial aggregation is added to the current aggregation node, where a Key function is used, and the Append operation may be used.

Figure 10:
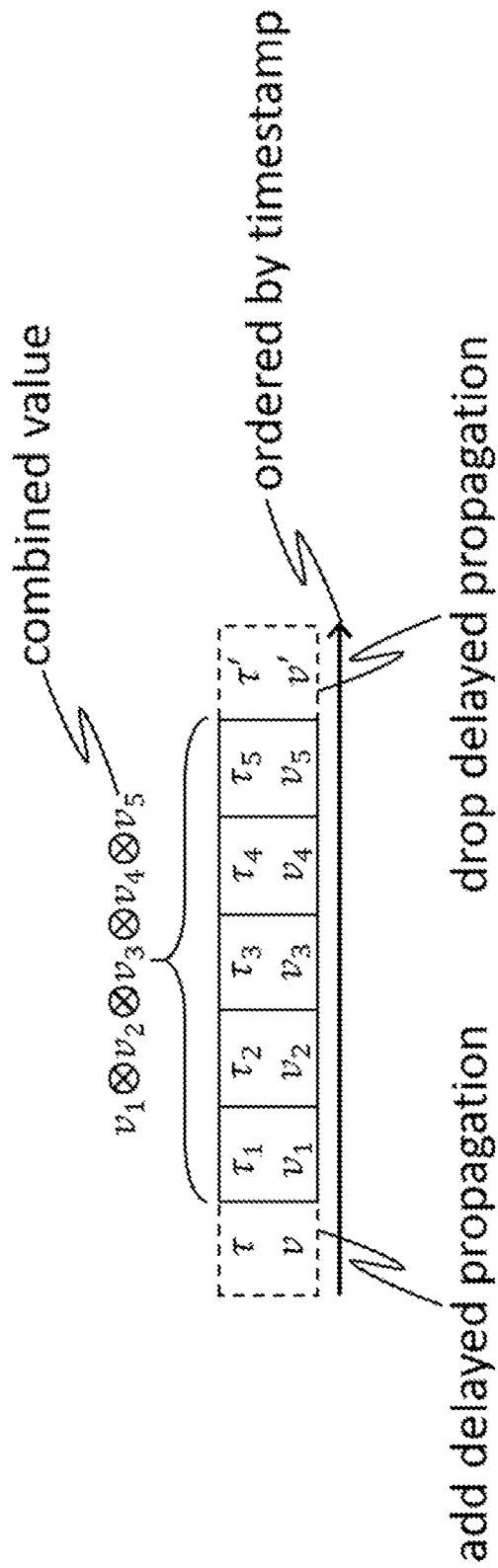
FIG. 10 illustrates partial aggregations with inverses, according to an embodiment.

In the following, efficient implementations of partial aggregations are described. A special case is considered below, where the monoid with domain D and operation $\otimes$ also has an inverse function $^{-1}$: D→D. For instance, if $\otimes$ is the addition over the integers then the inverse of d∈D is −d. For this special case, a partial aggregation stores the propagations in a queue (first in, first out). Furthermore, it maintains as a value the combination of the propagations' values as shown in FIG. 10. The value of the partial aggregation is updated accordingly when adding or removing propagations.

As an example, consider an implementation that stores the propagations in doubly-linked lists with pointers to the front and back.
  Whenever a propagation is added (P.Add), it is added to the front to the list (see FIG. 10). Furthermore, the value of the partial aggregation P is updated with the value v of the added propagation, i.e., the value of the partial aggregation P is set to v⊗P.Value( )
  Whenever a propagation is dropped (P.Drop), it is removed from the rear of the list (see FIG. 10). Furthermore, when the value of the partial aggregation P is updated with the inverse value v of the propagation, the value of the partial aggregation P is set to P.Value( )⊗$v^{-1}$. When removing all the propagations for the given timestamp t from P, the method iterates from the rear of the list through the propagations until a propagation is visited with a smaller timestamp. The values of the visited propagations are combined, the value of the partial aggregation is updated accordingly with the inverse value, and the propagations are removed from the list.

Furthermore, P.Value( ) returns the value of the partial aggregation P, P.Key( ) returns the timestamp of the first element in P's propagation slice, and P.Append(Q) updates P's value with Q's value and appends Q's list of propagations to P's list of propagations.

For the invariant that the list of propagations is ordered by their timestamps, it is assumed that an added propagation has a smaller timestamp. Analogously, a similar assumption is made when appending propagations. Furthermore, for implementing P.Append efficiently, P.Append(Q) "steals" Q's list and assumes that Q is not used afterwards. These assumptions are met when propagating values to an aggregation node as described above.

The amortized worst-case complexity of the operations is O(1) for this implementation of partial aggregations. Important observations include that (i) the value is not recomputed by P.Value( ) and (ii) P.Drop(t) performs at most linear many $\otimes$ operations with respect to the added and undropped propagations through by P.Add(t, v) or P.Append(Q).

Turning now to an example of a general case, consider that the monoid does not necessarily have an inverse function. Instead of a single queue, two arrays or lists are used for storing the propagations. Additionally values for subaggregations are stored to quickly remove propagations. An example of the corresponding struct type in the Go programming language may be as follows:
  type PartialAggregation struct {
    val Value//Aggregated value of the propagation values in front.
    front [ ]propagation
    back [ ]aggregated
  }
with
  type propagation struct {
    ts Timestamp//Timestamp of the propagation.
    val Value//Value of the propagation.
  }
and
  type aggregated struct {
    propagation
    comb Value//Aggregated value of the propagation values in the back slice
      //from index 0 to the index of the respective entry.
  }
where front and back are slices, i.e., dynamically-sized arrays. The propagations in the slice front are ordered descendingly with respect to their timestamps and the propagations in the slice back are ordered ascendingly. This allows for quickly adding new propagations to the front slice and removing propagations from the back slice. The implementation of the functions and operations for partial aggregations may be as follows, where k is the length of P.front and l is the length of P.back, where it is assumed without loss of generality that the partial aggregation P contains at least one propagation, i.e., not both k and l can be 0.
  P.Key( ) returns P.front[k−1].ts if k>0, and P.back[0].ts, otherwise.
  P.Value( ) returns P.val if l=0, and P.val⊗P.back[l−1].comb, otherwise.
  P.Add(t, v) adds the propagation at the end of P.front and updates P.val accordingly, i.e., P.front is set to append (P.front,propagation{t, v}) and P.val is set to v⊗P.val.
  P.Append(Q) combines the two front slices of P and Q, i.e., P.front is set to the slice
  Q.front appended with the slice P.front, i.e., P.front is set to append(Q.front, P.front). P.val is set to P.val⊗Q.val and P.back is set to Q.back. Note that we assume here that the slice P.back is empty. Furthermore, since P "steals" Q's slices, we assume that Q is not used afterwards.

P.Drop(t) updates P's front and back slices as follows.

Case k>0 and P.front[0].ts is not before t: P.back is set to the empty slice. The propagations stored in P.front and after t are moved to P.back in reverse order. The corresponding comb values in the entries of the slice P.back are set accordingly. Finally, P.front is set to the empty slice and P.val is set to the monoid's neutral element.

Otherwise: a binary search is made in P.back to find the smallest index i where the entry has a timestamp that is not before t. Afterwards, the corresponding propagations are dropped in P.back, i.e., and P.back is set to P.back[:i].

Figure 11:
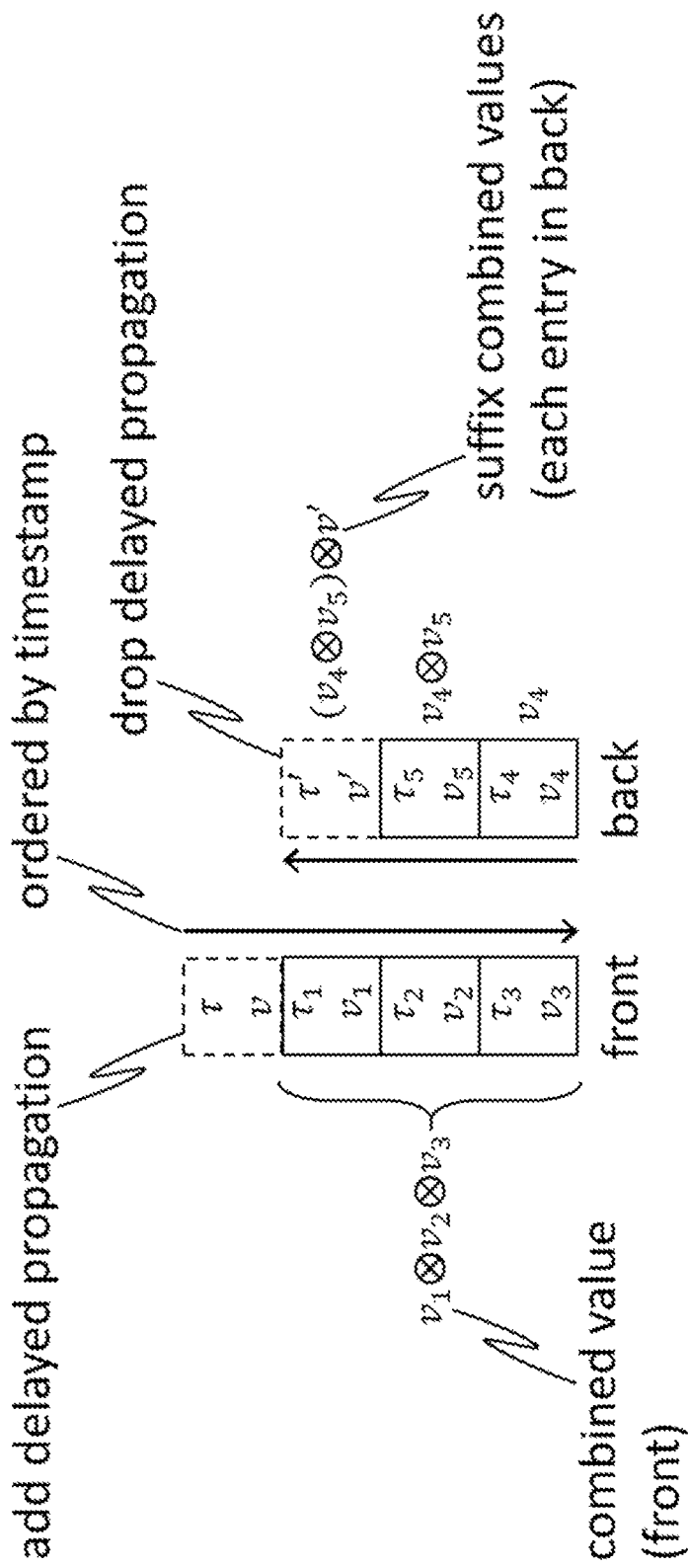
FIG. 11 illustrates partial aggregations, according to an embodiment.
Figure 12:
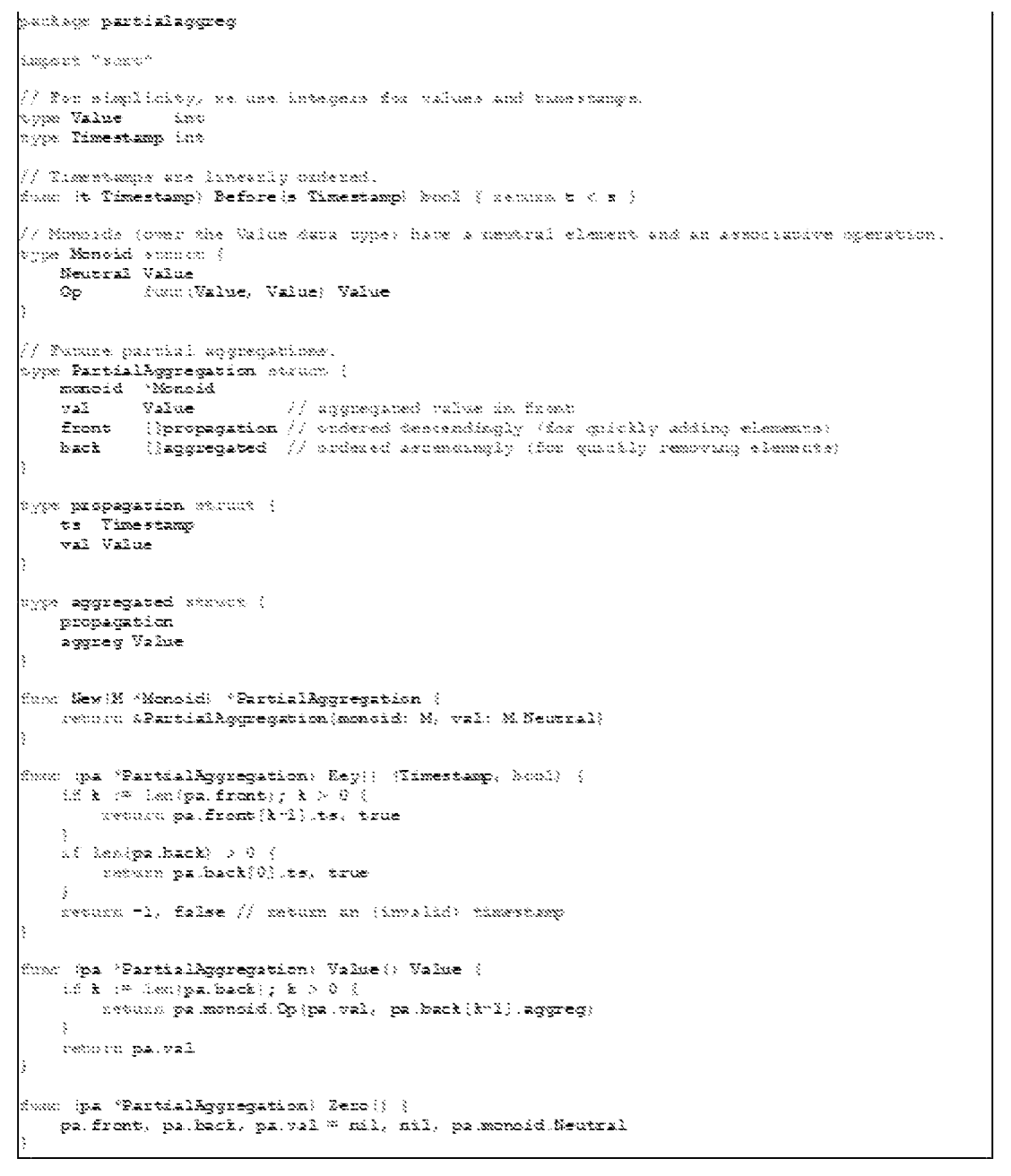

FIG. 11 illustrates a Partial Aggregation data structure (PartialAggregation) with the front and back slices according to an embodiment. Note delayed propagations can also be dropped directly from the front slice. In this case, the back is first emptied and the remaining entries in front are moved to the back slice. For an example of these operations above in the programming language Go, see the Listings 1 and 2 in FIGS. 12 and 13, respectively, where the monoid is added to the PartialAggregation type and where values and timestamps are for simplicity of the machine-integer type.

A similar assumption may be made as in the special case, e.g., that an added propagation has a smaller timestamp than the already stored propagations. Also as in the special case, the amortized worst-case complexity of the operations is $O(1)$. Other implementations for partial aggregations with similar complexity bounds are possible. For example, instead of slices doubly-linked lists may be used. However, slices often provide a slightly smaller overhead as they store their elements in consecutive memory cells. Another implementation is based on a tree-like data structure and a greedy approach of combining values as described in D. Basin, F. Klaedtke, and E. Zalinescu: "Greedily computing associative aggregations on sliding windows," Information Processing Letters, 115(2), 2015 (the entire contents of which are hereby incorporated by reference herein). Based on the described data structure and approach one can reduce the number of carried out $\otimes$ operations further. This is of interest when $\otimes$ is a costly operation and the cost of maintaining the tree-like data structure is small in comparison to $\otimes$. Finally, neither the greedy approach with its tree-like data structure described in D. Basin, F. Klaedtke, and E. Zalinescu: "Greedily computing associative aggregations on sliding windows," Information Processing Letters, 115(2), 2015] nor the mentioned "TwoStack" solution mentioned in K. Tangwongsan, M. Hirzel, and S. Schneider: "Optimal and general out-of-order sliding-window aggregation," Proceedings of the VLDB Endowment, 12(10), 2020 (the entire contents of which are hereby incorporated by reference herein) apply to the setting where stream elements in data streams may appear out of order.

Gap Split

According to an embodiment, when receiving a new stream element, a gap that contains the timestamp of the stream element in the graph-based data structure may be split. Splitting a gap may be done as described in D. Basin, F. Klaedtke, and E. Zalinescu: "Runtime verification over out-of-order streams," ACM Transactions on Computational Logic, 21(1):5, 2020 and F. Klaedtke: "Method for operating a monitoring entity," U.S. Ser. No. 10/725,887B2. The explicit vertical links of the nodes should preferably be adjusted, whereas no adjustments for the implicit vertical links are necessary. The pending and delayed propagations of the aggregation nodes should also preferably be adjusted. Furthermore, splitting a gap may trigger the propagation of values, possibly including some of the delayed propagations, and the deletion of irrelevant nodes.

Gap Removal

According to an embodiment, a gap may be removed from the graph-based data structure when it becomes known that the gap does not contain any time points. Such information may be received through so-called watermark messages that inform the stream processor that all stream elements up to a certain time have been received. Alternatively, sequence numbers may be used to derive whether all stream elements in a certain period of time have been received. See D. Basin, F. Klaedtke, and E. Zalinescu: "Runtime verification over out-of-order streams," ACM Transactions on Computational Logic, 21(1):5, 2020.

As for splitting a gap, the removal of a gap may be done as described in D. Basin, F. Klaedtke, and E. Zalinescu: "Runtime verification over out-of-order streams," ACM Transactions on Computational Logic, 21(1):5, 2020 and F. Klaedtke: "Method for operating a monitoring entity," U.S. Ser. No. 10/725,887B2. Again, pending and delayed propagations should also preferably be adjusted.

As already described above, the present disclosure improves and extends the graph-based data structure described in D. Basin, F. Klaedtke, and E. Zalinescu: "Runtime verification over out-of-order streams," ACM Transactions on Computational Logic, 21(1):5, 2020 and the optimized version of it described in F. Klaedtke: "Method for operating a monitoring entity," U.S. Ser. No. 10/725,887B2. For example, the present disclosure describes how to aggregate values over sliding windows efficiently by (1) delaying propagations at aggregation nodes, (2) collecting the delayed propagations at the nodes as partial aggregations, and (3) propagating the partial aggregations to multiple nodes whereby correctly maintaining the partial aggregations during the propagations. The values of the stream elements are combined through an associative operator and may be received out of order.

A similar setting as the one in the present disclosure is also considered in F. Klaedtke: "Efficient stream processing with data aggregations in a sliding window over out-of-order data streams," US20210124746A1 (the entire contents of which are hereby incorporated by reference herein). Therein, stream elements with no gaps between the stream elements are grouped together and their values are aggregated together when the respective stream elements completely cover a time window. Such a grouping also maintains aggregations for the left-most and right-most time windows that are fully covered by the grouping. These aggregations may be used to compute the aggregated values of the complete time windows within the grouping that results from merging two adjacent groupings.

The setting of aggregating values from out-of-order streams is also considered in J. Traub, P. M. Grulich, A. Rodriguez Cuellar, S. Breß, A. Katsifodimos, T. Rabl, and V. Markl: "Scotty: General and efficient open-source window aggregation for stream processing systems." ACM Transactions on Database Systems. 46(1):1, 2021 (the entire contents of which are hereby incorporated by reference herein). The underlying idea in the work by Traub et al. is the grouping of stream elements into "slices" and the separate value aggregation for each slice. These slice aggregations are then used for computing the aggregation of the stream elements within a time window. Namely, whenever all stream elements in a time window have been received, the slices within the time window are selected and the slice aggregations are aggregated together. This is sound, since Traub et al. require that a slice is either fully contained in a time window or not contained at all in the time window. A slice may be contained in multiple time windows and the slice aggregation is thus used multiple times in such a case. Traub et al.'s proposed architecture consists of components for initializing slices, for updating the slices when receiving new stream elements, and for computing the aggregated values from the slices. Note that there is an overhead in managing the slices. This overhead can become a significant factor if there are, e.g., many small slices, which is the case when the time windows often overlap.

In contrast to the above two works, the partial aggregations in the present disclosure have a small overhead and seamlessly integrate into the graph-based data-structure of D. Basin, F. Klaedtke, and E. Zalinescu: "Runtime verification over out-of-order streams," ACM Transactions on Computational Logic, 21(1):5, 2020 and F. Klaedtke: "Method for operating a monitoring entity," U.S. Ser. No. 10/725,887B2. For example, the partial aggregations in this disclosure are agnostic to the time window sizes and are updated in real time. Another difference of embodiments of the present disclosure is the direct support of composability. Recall that the graph-based data structure may be horizontally structured in layers and vertically in segments. It is straightforward to combine and even nest aggregations by having several layers for the combinations and the aggregations. The vertical links define the dependencies and determine where values must be propagated to. Furthermore, note that gaps are explicitly represented as segments. This has the advantage that when a value of a node in a gap is known or can be inferred, it can be propagated upwards in certain cases. This in turn can lead to outputting an aggregation result for a time window earlier.

Embodiments of the present disclosure advantageously include:
1) Delaying value updates to the tentative aggregation value of a time window and collecting multiple delayed value updates into a single value update for the time window; and/or
2) Real-time adjustment of a value update that consists of multiple delayed value updates for a time window to single value updates for adjacent time windows. The adjustments are adding and dropping delayed value updates and the combination of two such value updates. Here, the delayed value updates are stored ordered such that (a) the ones at the frontiers (i.e., the first and the last) can be accessed quickly and (b) the delayed value updates are augmented with partial (prefix and suffix) aggregations of the delayed value updates.

The technical improvements advantageously result in better worst-case complexities and hence performance and scalability improvements in data-stream processing, in particular, for computing aggregations over out-of-order data streams with large sliding windows or high data velocity rates.

Embodiments of the present disclosure support aggregations with an underlying associative operator. Requiring associative operators is commonly and widely used in aggregating data in stream processing, i.e., associative operators have already broad applications. This is advantageous over the state of the art, which is more restrictive, i.e., only supporting commutative operators.

In certain embodiments, checking whether the values of an incomplete time window satisfies a certain "monotonic" condition is not provided because delayed propagations may not be included in the aggregated value.

Embodiments of the present disclosure may be used for differentiation of IoT (internet of things) platform business (e.g., FIRWARE). Stream processing can be an integral part in applications that collect and analyze data from IoT devices.

Embodiments of the present disclosure may be implemented to enhancing the security of IoT platforms and security operations centers (SOCs), which analyze data streams.

Further relevant information (discussing a similar setting) can be found in: J. Traub, P. M. Grulich, A. Rodriguez Cuellar, S. Breß, A. Katsifodimos, T. Rabl, and V. Markl. "Scotty: General and efficient open-source window aggregation for stream processing systems." ACM Transactions on Database Systems. 46(1):1, 2021 ("Traub et al.") (the entire contents of which is hereby incorporated by reference herein). For overlapping time windows, the approach of the approach of the present disclosure should scale better versus that of Traub et al., and thus, result in better performance for computing aggregations over out-of-order data streams.

An aspect of the present disclosure provides a method for computing aggregations in a sliding window over out-of-order data streams by delaying value propagations. The method includes one or more of the following:
1) A node's status becomes final, e.g., because of a newly received stream element or because the node has received a value from a node on a lower layer;
2) The node initiates the propagation of its final value along its outgoing vertical link to the closest aggregation node on the upper layer. In particular, the propagation (i.e., propagated value) may added to an existing partial aggregation of the aggregation node. The partial aggregation may include or consist of the delayed propagations at this aggregation node;
3) The aggregation nodes in scope of the propagating node are iteratively processed until the propagation ends or the propagation is paused;
4) When carrying out the propagation at an aggregation node, the tentative value of the aggregation node is updated by the value of the partial aggregation. If the aggregation node is complete, its value becomes final and the aggregation node outputs its value or propagates it to a node on an upper layer. The propagation on this layer continues with the next aggregation node, where the irrelevant propagations in the partial aggregation are dropped and the partial aggregation is combined with the partial aggregation of the next node; and/or
5) When delaying a propagation at an aggregation node, the propagation can resume at a later time, e.g., together with a value received from another node on the lower layer.

As a person of ordinary skill in the art would understand, all methods, devices, elements, units and means described in the present application could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, these methods and functionalities can be implemented in respective software or hardware elements, or any kind of combination thereof.

Figure 14:
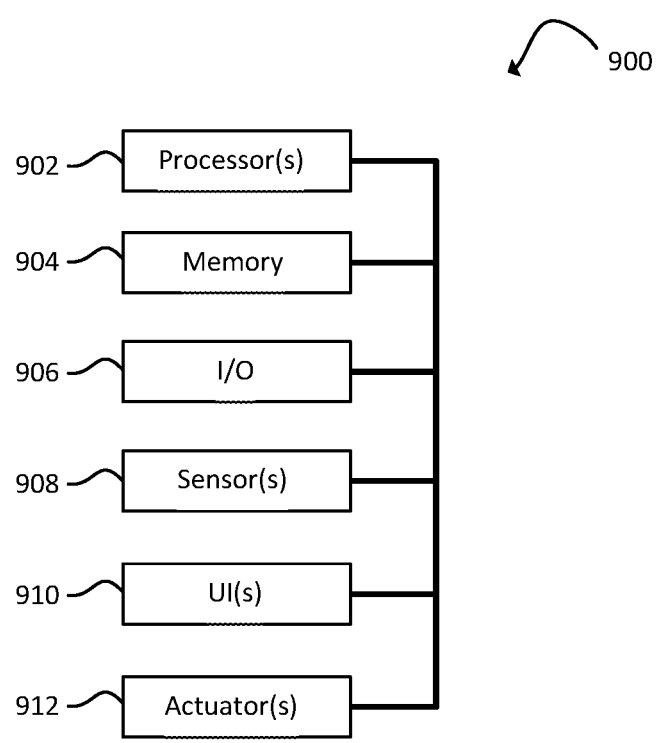
FIG. 14 illustrates a processing system, according to an embodiment.

Referring to FIG. 14, a processing system 900 can include one or more processors 902, memory 904, one or more input/output devices 906, one or more sensors 908, one or more user interfaces 910, and one or more actuators 912. Processing system 900 can be representative of each computing system disclosed herein.

Processors 902 can include one or more distinct processors, each having one or more cores. Each of the distinct processors can have the same or different structure. Processors 902 can include one or more central processing units (CPUs), one or more graphics processing units (GPUs), circuitry (e.g., application specific integrated circuits (ASICs)), digital signal processors (DSPs), and the like. Processors 902 can be mounted to a common substrate or to multiple different substrates.

Processors 902 are configured to perform a certain function, method, or operation (e.g., are configured to provide for performance of a function, method, or operation) at least when one of the one or more of the distinct processors is capable of performing operations embodying the function, method, or operation. Processors 902 can perform operations embodying the function, method, or operation by, for example, executing code (e.g., interpreting scripts) stored on memory 904 and/or trafficking data through one or more ASICs. Processors 902, and thus processing system 900, can be configured to perform, automatically, any and all functions, methods, and operations disclosed herein. Therefore, processing system 900 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 900 can be configured to perform task "X". Processing system 900 is configured to perform a function, method, or operation at least when processors 902 are configured to do the same.

Memory 904 can include volatile memory, non-volatile memory, and any other medium capable of storing data. Each of the volatile memory, non-volatile memory, and any other type of memory can include multiple different memory devices, located at multiple distinct locations and each having a different structure. Memory 904 can include remotely hosted (e.g., cloud) storage.

Examples of memory 904 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 904.

Input-output devices 906 can include any component for trafficking data such as ports, antennas (i.e., transceivers), printed conductive paths, and the like. Input-output devices 906 can enable wired communication via USB®, DisplayPort®, HDMI®, Ethernet, and the like. Input-output devices 906 can enable electronic, optical, magnetic, and holographic, communication with suitable memory 906. Input-output devices 906 can enable wireless communication via WiFi®, Bluetooth®, cellular (e.g., LTE®, CDMA®, GSM®, WiMax®, NFC®), GPS, and the like. Input-output devices 906 can include wired and/or wireless communication pathways.

Sensors 908 can capture physical measurements of environment and report the same to processors 902. User interface 910 can include displays, physical buttons, speakers, microphones, keyboards, and the like. Actuators 912 can enable processors 902 to control mechanical forces.

Processing system 900 can be distributed. For example, some components of processing system 900 can reside in a remote hosted network service (e.g., a cloud computing environment) while other components of processing system 900 can reside in a local computing system. Processing system 900 can have a modular design where certain modules include a plurality of the features/functions shown in FIG. 9. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive. It will be understood that changes and modifications may be made, by those of ordinary skill in the art, within the scope of the above description, which may include any combination of features from different embodiments described above.

What is claimed is:

1. A computer-implemented method of computing data aggregations in a sliding window over out-of-order data streams received from a distributed system of data producer components by delaying value propagations, the method implemented in a processor connected to a memory storing a data structure including a hierarchical arrangement of nodes, wherein nodes on a same horizontal layer are associated to a same operator, initial value and metric constraint, the method comprising:

receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window;

creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists;

iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation;

determining for each next node whether to delay the propagation; and delaying propagation of the partial aggregation to a next aggregation node in response to determining that the propagation is to be delayed.

2. The method according to claim 1, further including, when a status of an aggregation node in the plurality of aggregation nodes is final, sending a final value of the aggregation node to a node on a layer above the first horizontal layer.

3. The method according to claim 1, wherein the final value of the first node has a value type selected from the group consisting of Boolean, integer, strings, floating point, vector and map.

4. The method according to claim 1, wherein the determining for a next node whether to delay the propagation includes determining whether the next node is waiting for a value from a predecessor node on the same horizontal layer as the first node.

5. The method according to claim 1, further including resuming propagation of a delayed partial aggregation at a later time in response to receiving, by the node where the delay occurred, a value from another node on the lower layer.

6. The method of claim 1, wherein a partial aggregation is stored as a balanced search tree or an ordered array.

7. The method of claim 1, further including dropping a delayed propagation of the partial aggregation at an aggregation node when it is determined that the aggregation node is no longer within the time window of the first aggregation node.

8. A network device in a distributed system, the network device comprising:
  one or more processors; and
  a memory storing instructions and a data structure including a hierarchical arrangement of nodes, wherein nodes on a same horizontal layer are associated to a same operator, initial value and metric constraint, wherein the instructions when executed by the one or more processors cause the network device to implement a method of computing aggregations in a sliding window over out-of-order data streams received from data producer components of the distributed system of by delaying value propagations, the method comprising:
  receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window;
  creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists;
  iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation;
  determining for each next node whether to delay the propagation; and
  delaying propagation of the partial aggregation to a next aggregation node in response to determining that the propagation is to be delayed.

9. The network device of claim 8, wherein the memory further stores instructions, which when executed by the one or more processors cause the network device to, when a status of an aggregation node in the plurality of aggregation nodes is final, sending a final value of the aggregation node to a node on a layer above the first horizontal layer.

10. The network device of claim 8, wherein the instructions for determining for a next node whether to delay the propagation includes instructions for determining whether the next node is waiting for a value from a predecessor node on the same horizontal layer as the first node.

11. The network device of claim 8, wherein the final value of the first node has a value type selected from the group consisting of Boolean, integer, strings, floating point, vector and map.

12. The network device of claim 8, wherein the memory further stores instructions, which when executed by the one or more processors cause the network device to resume propagation of a delayed partial aggregation at a later time in response to receiving, by the node where the delay occurred, a value from another node on the lower layer.

13. The network device of claim 8, wherein a partial aggregation is stored in the memory as a balanced search tree or an ordered array.

14. The network device of claim 8, wherein the memory further stores instructions, which when executed by the one or more processors cause the network device to drop a delayed propagation of the partial aggregation at an aggregation node when it is determined that the aggregation node is no longer within the time window of the first aggregation node.

15. A tangible, non-transitory computer-readable medium having instructions thereon which, upon being executed by one or more processors, alone or in combination, provide for execution of method of computing aggregations in a sliding window over out-of-order data streams received from a distributed system of data producer components by delaying value propagations, the method comprising:
  defining a data structure in a memory unit coupled to the one or more processors, the data structure including a hierarchical arrangement of nodes, wherein nodes on a same horizontal layer are associated to a same operator, initial value and metric constraint;
  receiving, at a first aggregation node of a plurality of aggregation nodes in a first time window on a first horizontal layer of the data structure, a final value from a first node in a lower layer of nodes below the plurality of aggregation nodes, wherein the final value includes a data value and a time stamp, and wherein the first node is within a scope of each of the plurality of aggregation nodes in the first time window;
  creating a partial aggregation of the first aggregation node using the final value when no existing partial aggregation of the first aggregation node exists, or combining the final value with the existing partial aggregation of the first aggregation node to create the partial aggregation of the first aggregation node when the existing partial aggregation of the first aggregation node exists;
  iteratively propagating the partial aggregation of the first aggregation node to the remaining aggregation nodes of the plurality of aggregation nodes in the first time window in order, wherein for each next node of the remaining aggregation nodes, a tentative value of the aggregation node is updated by the value of the partial aggregation;
  determining for each next node whether to delay the propagation; and delaying propagation of the partial aggregation to a next aggregation node in response to determining that the propagation is to be delayed.

\* \* \* \* \*